US008169184B2

(12) United States Patent
Li et al.

(10) Patent No.: US 8,169,184 B2
(45) Date of Patent: May 1, 2012

(54) SELF-ADAPTABLE RECHARGER

(76) Inventors: Shiqing Li, Shenzhen (CN); Qinghai Wang, Shenzhen (CN)

(*) Notice: Subject to any disclaimer, the term of this patent is extended or adjusted under 35 U.S.C. 154(b) by 338 days.

(21) Appl. No.: 12/595,040

(22) PCT Filed: Apr. 17, 2008

(86) PCT No.: PCT/CN2008/000790
§ 371 (c)(1),
(2), (4) Date: Oct. 7, 2009

(87) PCT Pub. No.: WO2008/128429
PCT Pub. Date: Oct. 30, 2008

(65) Prior Publication Data
US 2011/0101910 A1    May 5, 2011

(30) Foreign Application Priority Data
Apr. 18, 2007 (CN) .......................... 2007 1 0074106

(51) Int. Cl.
*H01M 10/46* (2006.01)
(52) U.S. Cl. ........................................ 320/106; 320/141
(58) Field of Classification Search .................. 320/106, 320/107, 114, 115, 126, 138, 141, 162
See application file for complete search history.

(56) References Cited

U.S. PATENT DOCUMENTS

| 5,568,037 | A |   | 10/1996 | Massaroni |
| 7,378,819 | B2 | * | 5/2008 | Wang et al. ................... 320/121 |
| 2006/0152194 | A1 | * | 7/2006 | Wang et al. ................... 320/121 |

FOREIGN PATENT DOCUMENTS

| CN | 1099192 A | 2/1995 |
| CN | 202038797 Y | 3/2008 |
| JP | 3-139128 A | 6/1991 |

* cited by examiner

Primary Examiner — Edward Tso

(57) ABSTRACT

A self-adaptable recharger includes a control circuit connected to a power-supply circuit, a current-sampling circuit and a pulse-based recharge circuit. The control circuit includes a microprocessor. The pulse-based recharge circuit includes parallel recharge branches each under control of a pin of the microprocessor. The microprocessor receives voltage-related and current-related signals from each of the recharge branches and compares the same with basic data stored therein to determine the types of batteries. The microprocessor calculates time-related changes in the voltage-related and current-related signals and a voltage difference between positive and zero pulses to determine the recharge status and correct recharging curves accordingly. The microprocessor determines the highest recharge voltage, a positive slope of voltage, a zero gain of voltage, a negative gain of voltage and a capacity gain to determine an energy level in each of the batteries and stops the recharge when the battery is full.

9 Claims, 3 Drawing Sheets

SELF-ADAPTABLE RECHARGER

BACKGROUND OF THE INVENTION

1. Field of the Invention

The present invention relates to a recharger and, more particularly, to a self-adaptable recharger for identifying various types of batteries and selecting from several recharge programs.

2. Related Prior Art

There are rechargers for nickel-metal hydride ("Ni-MH" or "Ni—H") batteries and nickel-cadmium ("Ni—Cd") batteries and other rechargers for alkaline batteries. For recharging an alkaline battery, a current-limited, constant-voltage method or a time-fixed method is used. There are however problems with these methods. Where a current-limited, constant-voltage method is used, the electrolyte in some alkaline batteries could be reduced after repeated recharge and discharge so that the internal resistances are increased. If the saturation cutoff voltage remains constant, the recharge efficiency would be very low. In some other alkaline batteries, some of the zinc paste at the negative electrodes could crystallize so that the internal resistances are reduced. In this case, most of the energy is used to electrolyze water into hydrogen and oxygen in the alkaline batteries. Such hydrogen and oxygen increase the pressure in the alkaline batteries, and the increased pressure might cause leak and explosion.

There is a conventional technique for recharging Ni-MH, Ni—H, lead acid and disposable zinc-manganese batteries. However, a user must use a switch S to select from various values of voltage for recharging different types of batteries. Hence, this technique is not self-adaptable. Moreover, as a serial constant-pressure control method is used, there could be excessive or inadequate recharge and/or leak because the internal resistances and recharge curves change from one battery to another.

There is a conventional recharger for two types of batteries. By measuring the temperature and voltage of a battery under test, an optimal method can be selected from nine available methods. However, this recharger cannot be used for alkaline batteries.

The present invention is therefore intended to obviate or at least alleviate the problems encountered in prior art.

SUMMARY OF THE INVENTION

It is the primary objective of the present invention to provide a self-adaptable circuit for recharging alkaline batteries, Ni-MH batteries and Ni—Cd batteries.

To achieve the foregoing objective, the self-adaptable recharger includes a control circuit connected to a power-supply circuit, a current-sampling circuit and a pulse-based recharge circuit. The control circuit includes a microprocessor. The pulse-based recharge circuit includes parallel recharge branches each under control of a pin of the microprocessor. The microprocessor receives voltage-related and current-related signals from each of the recharge branches and compares the same with basic data stored therein to determine the types of batteries. The microprocessor calculates time-related changes in the voltage-related and current-related signals and a voltage difference between positive and zero pulses to determine the recharge status and correct recharge curves accordingly. The microprocessor determines the highest recharge voltage, a positive slope of voltage, a zero gain of voltage, a negative gain of voltage and a capacity gain to determine an energy level in each of the batteries and stops the recharge when the battery is full.

Other objectives, advantages and features of the present invention will become apparent from the following description referring to the attached drawings.

BRIEF DESCRIPTION OF THE DRAWINGS

The present invention will be described via detailed illustration of the preferred embodiment referring to the drawings.

DETAILED DESCRIPTION OF THE INVENTION

Figure 1:
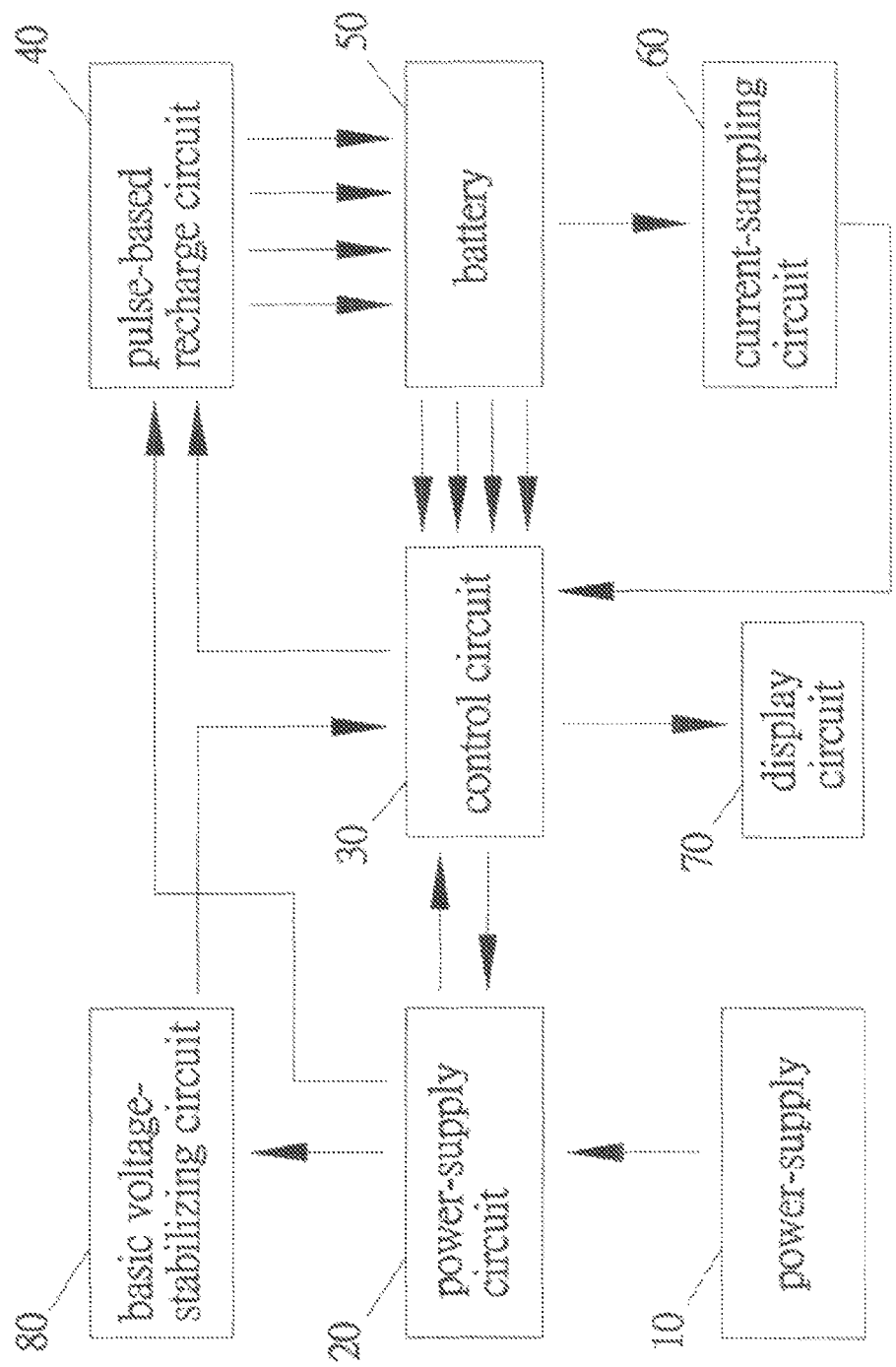
FIG. 1 is a block diagram of a self-adaptable recharger according to the preferred embodiment of the present invention.

Referring to FIG. 1, a self-adaptable recharger includes a power-supply circuit 20, a control circuit 30, a pulse-based recharge circuit 40, a current-sampling circuit 60, a display circuit 70 and a basic voltage-stabilizing circuit 80 according to the preferred embodiment of the present invention. A power supply 10 supplies an 85-265 voltage ("V") alternative current ("AC") to the power-supply circuit 20.

The power-supply circuit 20 transforms and transmits the electricity to the control circuit 30, the display and the basic voltage-stabilizing circuit 80. In addition, the power-supply circuit 20 provides a voltage to the basic voltage-stabilizing circuit 80.

The basic voltage-stabilizing circuit 80 provides the control circuit 30 with a stabilized voltage as a basic voltage. Parameters and programs are stored in the control circuit 80 beforehand. For example, highest voltages, longest periods, initial output voltages from the power supply, internal resistances and negative gains of voltages.

The control circuit 30 instantly acquires current-related information from the current-sampling circuit 60 and voltage-related information from the pulse-based recharge circuit 40. Based on the information, the control circuit 30 controls the output from the power-supply circuit 20 and the pulse-space ratio of the pulse-based recharge circuit 40 to complete the recharge of a battery 50.

Figure 2:
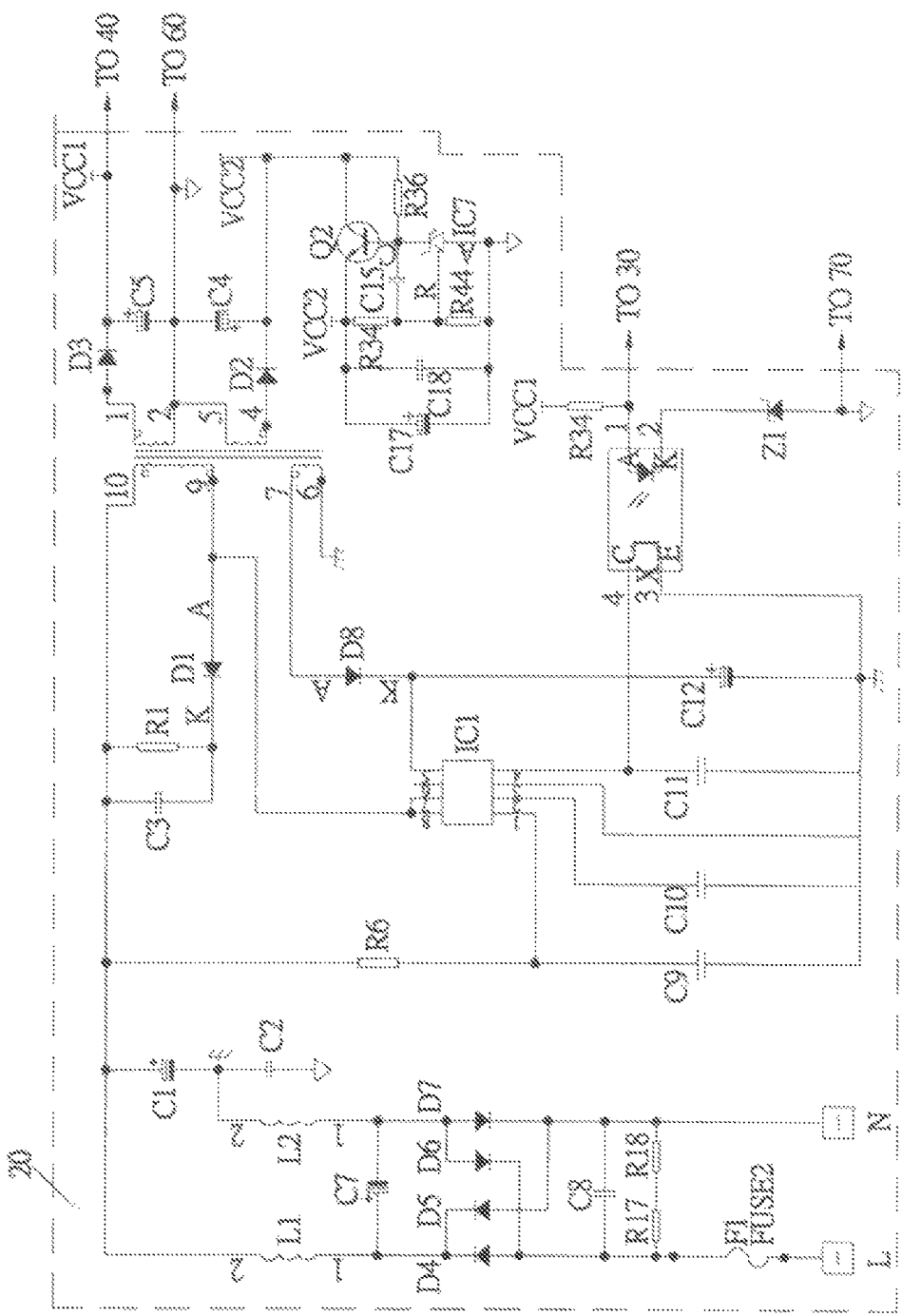
FIG. 2 is a partial circuit diagram of the self-adaptable recharger shown in FIG. 1.
Figure 3:
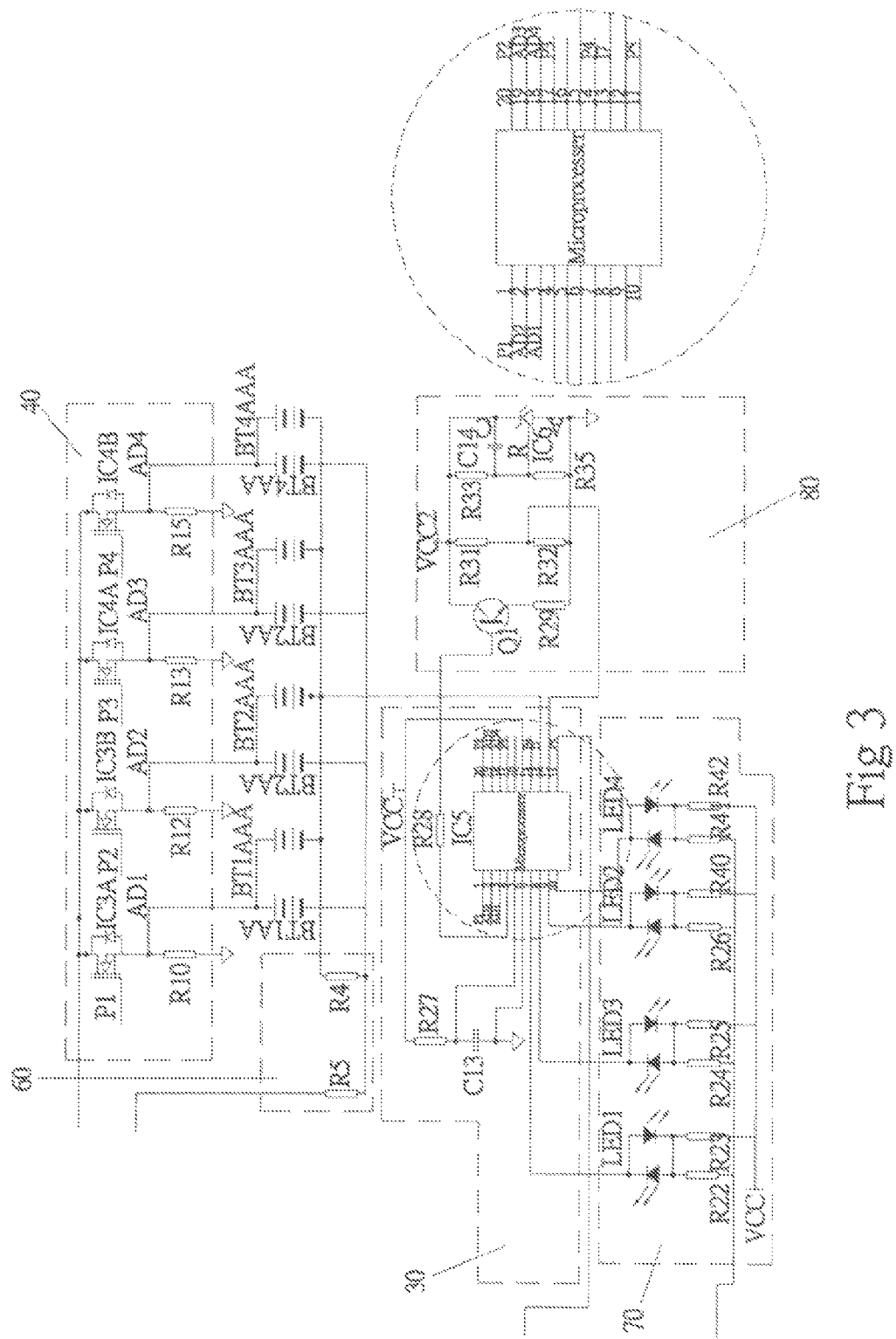
FIG. 3 is another partial circuit diagram of the self-adaptable recharger shown in FIG. 1.

Referring to FIG. 2, more details will be given to the circuits. The 85-265 VAC is rectified and filtered before it is sent to a transformer T1 through a switch-adjusting module IC1. The transformer T1 provides two voltages. The first voltage is rectified and filtered with a diode D3 and a capacitor C5 and turned into another voltage Vcc1 (3V) before it is sent to the battery 50 through the pulse-based recharge circuit 40. The second voltage is rectified and filtered with a diode D2 and a capacitor C4 and turned into another voltage Vcc2 (10V). The voltage Vcc2 is stabilized with a triode Q2 and a chip IC7 and turned into another voltage Vcc (5V) before it is sent to a microprocessor IC5 within the control circuit 30. On the other hand, the voltage Vcc2 is sent to a stabilizing chip IC6 within the basic voltage-stabilizing circuit 80 that stabilizes the voltage Vcc and provides the control circuit 30 with the voltage as the basic voltage.

The microprocessor IC5 sends a control signal to the power-supply circuit 20 via a photoelectric coupler IC2. In detail, the power-supply circuit 20 includes a switch-adjusting module IC1. Based on the control signal from the pin #11 of the IC5, the photoelectric coupler IC2 controls the output from the switch-adjusting module IC1, thus adapting the power-supply circuit 20 to the type of and status of the battery 50.

The power-supply circuit 20 includes a peak voltage-absorbing loop for absorbing a peak voltage that occurs in the transformer T1 when the switch-adjusting module IC1 is turned off. Thus, the security of the switch-adjusting module IC1 is ensured. The peak voltage-absorbing loop consists of a diode D1, a resistor R1 and a capacitor C3.

The switch-adjusting module IC1 includes a 135-degree protecting circuit (not shown). When the temperature reaches an upper limit, the switch-adjusting module IC1 reduces the power from the power-supply circuit 20, thus protecting the elements from heat.

The current-sampling circuit 60 consists of a resistor R5 and R4. The current-sampling circuit 60 is arranged in the recharger so that it provides the pin #13 of the microprocessor IC5 with the current-related information for any type of batteries in a certain status, thus sampling the recharge current.

The basic voltage-stabilizing circuit 80 includes a triode Q1, a voltage-stabilizing chip IC6, resistors R29, R31, R32, R33 and R35 and a capacitor C14. Based on a signal from the pin #4 of the microprocessor IC5, the basic voltage-stabilizing circuit 80 sends stabilized voltages to the pin #12 of the microprocessor IC5, thus stabilizing the voltage.

The display circuit 70 includes four parallel display branches. The first display branch includes a light-emitting diode LED1 connected to resistors R22 and R23 in series. The second display branch includes a light-emitting diode LED2 connected to resistors R24 and R25 in series. The third display branch includes a light-emitting diode LED3 connected to resistors R26 and R40 in series. The fourth display branch includes a light-emitting diode LED4 connected to resistors R41 and R42 in series. The display branches receive information about the batteries from pins #7, #8, #9 and #10 of the microprocessor IC5, respectively. Each of the display branches displays information as follows:

Self diagnosing: all of the light-emitting diodes flash in red and green alternatively;

Recharging a Ni-MH battery: a related one of the light-emitting diodes emits red light;

Recharging an alkaline battery: a related one of the light-emitting diodes flashes in red and green alternatively;

Recharging completed: a related one of the light-emitting diodes emits green light;

Refusing to recharge a Zn—Mn battery: none of the light-emitting diodes emits light;

Refusing to recharge a broken battery: a related one of the light-emitting diodes flashes in red;

Battery misplaced: a related one of the light-emitting diodes flashes in red; or Poor contact: a related one of the light-emitting diodes flashes in red.

The pulse-based recharge circuit 40 includes four parallel recharge branches. The first recharge branch includes a MOS switch IC3A connected to a resistor R10 in series. The second recharge branch includes a MOS switch IC3B connected to a resistor R12 in series. The third recharge branch includes a MOS switch IC4A connected to a resistor R13 in series. The fourth recharge branch includes a MOS switch IC4B connected to a resistor R15 in series. Based on signals from the pins #1, #20, #17, #14 of the microprocessor IC5, respectively, the recharge branches is turned on and off, recharges and stops. The recharge status in each of the recharge branches is shown in a related one of the display branches. The connection of the MOS switch IC3A to the resistor R10 is further connected to the pin #2 of the microprocessor IC5. The connection of the MOS switch IC3B to the resistor R2 is further connected to the pin #3 of the microprocessor IC5. The connection of the MOS switch IC4A to the resistor R13 is further connected to the pin #18 of the microprocessor IC5. The connection of the MOS switch IC4B to the resistor R15 is further connected to the pin #19 of the microprocessor IC5. Thus, the recharge status in each of the recharge branches is sampled.

The control circuit 30 includes the microprocessor IC5, resistors R27 and R28 and a capacitor C13. The resistor R27 and the capacitor C13 reset the microprocessor IC5. Based on the signal from the pin #4 of the microprocessor IC5, the resistor R28 controls the stabilized voltage from the basic voltage-stabilizing circuit 80.

Being the core of the self-adaptable recharger, the microprocessor IC5 executes the following tasks:

Initialization: after being reset, the microprocessor IC5 sets various parameters such as the highest recharge voltages and longest recharge periods for the types of batteries, the initial voltage from the power supply, the internal resistances and the negative gains of voltage, defines every input and output, and diagnoses itself.

Identifying the types of batteries: the microprocessor IC5 compares the voltage-related information acquired through the pins #3, #2, #19 and #18 and the current-related information acquired through the pin #13 with the basic information stored therein to precisely determine the types of the batteries.

Determining the recharge statuses: the microprocessor IC5 samples changes in the voltages and currents for the batteries and the voltage difference between a positive pulse and a zero pulse to calculate the internal resistances of the batteries to determine the recharge statuses, and corrects the recharge curves for the batteries accordingly;

Determining energy levels in the batteries: the microprocessor IC5 analyzes the highest voltages Vmax, positive slopes of voltages, zero gain of voltage $0\Delta V$, the negative gain of voltage $-\Delta V$ and capacity gains, and uses fuzzy control to determine whether the information is true or not. The microprocessor IC5 will take a responsive action if a phenomenon is true, or ignores if not. The microprocessor IC5 includes a counter (not shown) for counting the time after the recharge starts. When the other parameters do not work, and the counted time reaches one of the predetermined longest periods, the microprocessor IC5 stops the recharge to prevent excessive recharge.

Restoring a 0V or short-circuited battery: on detecting a 0V battery, the microprocessor IC5 instructs the pulse-based recharge circuit 40 to recharge the battery with high-frequency pulses for restoring the battery. If the voltage of the battery reaches a predetermined value such as 0.8V, the microprocessor IC5 instructs the pulse-based recharge circuit 40 to execute fast recharge. Otherwise, the display circuit 70 shows that the battery is broken, and the recharge is stopped. On detecting a short-circuited battery, the microprocessor IC5 instructs the power-supply circuit 20 and the pulse-based recharge circuit 40 to recharge the short-circuited battery with high-frequency, strong-current pulses.

The principle for the operation of the self-adaptable recharger can be summarized that the microprocessor IC5 removes interruption and harmonic waves from the sampled voltages via digital filtering, and analyzes the positive slopes of voltages, zero gain of voltage $0\Delta V$, the negative gain of voltage $-\Delta V$ and the highest voltages to determine whether they are true or not, and instructs the pulse-based recharge circuit 40 to work accordingly. The current-sampling circuit 60 sends the sampled current-related information to the microprocessor IC5 in which the sampled current-related information is converted and compared to the basic voltages. Then, the microprocessor IC5 sends the related control signal to the power-supply circuit 20 that adjust the recharge currents and power for the various batteries, and further considers the results of the determination of the voltage-related information to make the recharge curves consistent with actual curves for the batteries. Moreover, the microprocessor uses the counter to control the longest recharge periods. The counter starts to operate on the moment when the recharge begins. The microprocessor IC5 calculates the energy levels in the batteries according the sampled current-related information, and constantly corrects the highest voltages based on the energy level in the batteries. When certain requirements are met, the microprocessor IC5 stops of the generation of the pulses, and the recharge is completed.

The self-adaptable recharger of the present invention is advantageous over the prior art in several aspects. Firstly, it is neat and reliable. The control circuit 30 includes the microprocessor IC5 for directly controlling the switch-adjusting module of the power-supply circuit 20. Hence, only a few peripheral elements are needed. The power-supply circuit 20 receives 85-265VAC so that the self-adaptable recharger can be used everywhere around the world.

Secondly, the microprocessor IC5 directly controls the power-supply circuit 20 to make comprehensive adjustment based on the types and recharge statuses of the batteries. Thus, it is ensured that the recharge curves match actual curves and the optimal recharge effect is achieved.

Thirdly, a dynamic model is built. The fast recharge is stopped via calculating the various changes and determining the truth value of the various phenomena. Thus, excessive or inadequate recharge is avoided, and the lives of the batteries are extended.

Fourthly, 0V and short-circuited batteries can be restored.

Fifthly, it recharges the batteries with strong currents to reduce the recharge periods and costs. The microprocessor IC5 can be combined with the power supply well, and the resources of the power supply and the microprocessor IC5 are used well.

Sixthly, it protects itself.

Seventhly, the recharge branches, independent of one another, measure the energy level, the capacity and the time to avoid excessive or inadequate recharge that is common in serial recharge.

Eighthly, it can recharge a Ni-MH battery and an alkaline battery at the same time, and recharge several AA or AAA batteries.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A self-adaptable recharger comprising:
   a power-supply circuit;
   a current-sampling circuit;
   a pulse-based recharge circuit comprising parallel recharge branches; and
   a control circuit connected to the power-supply circuit, the current-sampling circuit and the pulse-based recharge circuit, wherein the control circuit comprises a microprocessor so that each of the parallel recharge branches is under control of a pin of the microprocessor, wherein the microprocessor receives voltage-related and current-related signals from each of the recharge branches and compares the same with basic data stored therein to determine the types of batteries, wherein the microprocessor calculates time-related changes in the voltage-related and current-related signals and a voltage difference between positive and zero pulses to determine the recharge status and correct recharge curves accordingly, wherein the microprocessor determines the highest recharge voltage, a positive slope of voltage, a zero gain of voltage, a negative gain of voltage and a capacity gain to determine an energy level in each of the batteries and stops the recharge when the battery is full.

2. The self-adaptable recharger according to claim 1, wherein the microprocessor comprises a counter for counting a recharge period so that the microprocessor steps the charging when the recharge period reaches an upper limit.

3. The self-adaptable recharger according to claim 1 comprising a display circuit connected to the microprocessor, wherein the display circuit comprises parallel display branches each for showing the recharge status in a related one of the recharge branches.

4. The self-adaptable recharger according to claim 1, wherein the microprocessor comprises a reset circuit to reset the microprocessor when the microprocessor is turned on.

5. The self-adaptable recharger according to claim 1 comprising a photoelectric coupler through which the microprocessor sends a signal for controlling the output from the power-supply circuit based on the type of a battery.

6. The self-adaptable recharger according to claim 5, wherein the power-supply circuit comprises a switch-adjusting module for controlling the output from the power-supply circuit based on the signal from the microprocessor.

7. The self-adaptable recharger according to claim 6, wherein the power-supply circuit comprises a peak voltage-absorbing loop for absorbing any peak voltages that occur therein when the switch-adjusting module is turned off.

8. The self-adaptable recharger according to claim 1 comprising a basic voltage-stabilizing circuit for providing the microprocessor with stabilized voltages.

9. The self-adaptable recharger according to claim 1, wherein the power-supply circuit receives alternative currents of 85 to 265 volts.

* * * * *